(12) United States Patent
Katoh

(10) Patent No.: US 10,682,938 B2
(45) Date of Patent: Jun. 16, 2020

(54) VEHICLE SEAT

(71) Applicant: Toyota Jidosha Kabushiki Kaisha, Toyota-shi (JP)

(72) Inventor: Kohshi Katoh, Hadano (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 16/158,477

(22) Filed: Oct. 12, 2018

(65) Prior Publication Data

US 2019/0111816 A1    Apr. 18, 2019

(30) Foreign Application Priority Data

Oct. 12, 2017    (JP) .................................. 2017-198244

(51) Int. Cl.
| | | |
|---|---|---|
| *B60N 2/58* | (2006.01) | |
| *B60N 2/68* | (2006.01) | |
| *B60N 2/02* | (2006.01) | |
| *B60N 2/70* | (2006.01) | |
| *B60N 2/50* | (2006.01) | |
| *B60N 2/54* | (2006.01) | |
| *B60N 2/72* | (2006.01) | |

(52) U.S. Cl.
CPC ............. *B60N 2/682* (2013.01); *B60N 2/028* (2013.01); *B60N 2/68* (2013.01); *B60N 2/7011* (2013.01); *B60N 2/502* (2013.01); *B60N 2/54* (2013.01); *B60N 2/72* (2013.01); *B60N 2002/684* (2013.01)

(58) Field of Classification Search
CPC .......... B60N 2/028; B60N 2/68; B60N 2/682; B60N 2/7011

USPC ..................................................... 297/452.56
See application file for complete search history.

(56) References Cited

U.S. PATENT DOCUMENTS

| | | | | |
|---|---|---|---|---|
| 4,580,840 A | * | 4/1986 | Cunningham | ....... B60N 2/7011 297/452.56 X |
| 5,013,089 A | | 5/1991 | Abu-Isa et al. | |
| 5,015,034 A | * | 5/1991 | Kindig | ...................... A47C 7/70 297/452.56 X |
| 5,439,271 A | | 8/1995 | Ryan | |
| 6,435,618 B1 | * | 8/2002 | Kawasaki | ................ A47C 7/28 297/452.56 |
| 6,485,103 B1 | | 11/2002 | Yamada et al. | |
| 6,676,218 B2 | * | 1/2004 | Fujita | .................... B60N 2/5891 297/452.56 X |
| 6,722,742 B2 | * | 4/2004 | Potes | ...................... A47C 7/282 297/452.56 |
| 6,739,671 B2 | * | 5/2004 | De Maina | ............ B60N 2/7011 297/440.1 |

(Continued)

FOREIGN PATENT DOCUMENTS

| | | |
|---|---|---|
| DE | 3831636 C1 | 9/1989 |
| DE | 694 08 094 T2 | 6/1998 |

(Continued)

*Primary Examiner* — Rodney B White
(74) *Attorney, Agent, or Firm* — Oblon, McClelland, Maier & Neustadt, L.L.P.

(57) ABSTRACT

A vehicle seat in which a net structure may be attached easily to a frame while ensuring rigidity of the seatback frame. In the vehicle seat, a net structure is drawn within a seat frame. The seat frame includes: a net frame in which the net structure is drawn, a receiving frame formed integrally with the seat frame, and a fastening mechanism that fastens the net frame to the receiving frame.

7 Claims, 15 Drawing Sheets

(56) References Cited

U.S. PATENT DOCUMENTS

| | | | |
|---|---|---|---|
| 6,926,358 B2* | 8/2005 | Fujita | B60N 2/4228 297/452.56 X |
| 7,152,929 B2 | 12/2006 | Wu | |
| 7,255,404 B2* | 8/2007 | Neale | B60N 2/5816 297/452.56 X |
| 7,416,256 B2* | 8/2008 | Fujita | B60N 2/502 297/452.56 X |
| 7,503,627 B2* | 3/2009 | Kawasaki | A47C 7/029 297/452.56 |
| 7,654,616 B2 | 2/2010 | Kinoshita et al. | |
| 7,971,939 B2* | 7/2011 | Fujita | B60N 2/70 297/452.56 |
| 8,029,066 B2 | 10/2011 | Su | |
| 8,297,708 B2* | 10/2012 | Mizobata | B60N 2/7011 297/452.56 X |
| 8,696,066 B2* | 4/2014 | Mizobata | B60N 2/682 297/452.56 X |
| 8,708,418 B2* | 4/2014 | Mizobata | B60N 2/5825 297/452.56 X |
| 8,727,445 B2* | 5/2014 | De Maina | B60N 2/686 297/452.56 X |
| 8,801,094 B2* | 8/2014 | Nishiura | B60N 2/7011 297/452.56 X |
| 10,239,421 B2* | 3/2019 | Katoh | B60N 2/028 |
| 10,391,902 B2* | 8/2019 | Gonzalez Uribe | B60N 2/68 |
| 2001/0040404 A1* | 11/2001 | Kawashima | A47C 7/282 297/452.56 |
| 2002/0060493 A1* | 5/2002 | Nishino | B60N 2/58 297/452.56 |
| 2002/0096932 A1* | 7/2002 | Fujita | B60N 2/58 297/452.56 |
| 2005/0242652 A1 | 11/2005 | Kepler et al. | |
| 2010/0289320 A1 | 11/2010 | Bock | |
| 2011/0133531 A1* | 6/2011 | Yeh | B60N 2/06 297/232 |
| 2012/0267939 A1* | 10/2012 | Ota | B60N 2/7011 297/452.56 |
| 2012/0297585 A1 | 11/2012 | Cvek | |
| 2014/0054947 A1 | 2/2014 | Su | |
| 2015/0239381 A1 | 8/2015 | Hamabe et al. | |
| 2015/0367756 A1* | 12/2015 | Katoh | B60N 2/666 297/285 |
| 2018/0022238 A1* | 1/2018 | Gonzalez Uribe | B60N 2/66 297/325 |

FOREIGN PATENT DOCUMENTS

| | | |
|---|---|---|
| DE | 603 11 450 T2 | 11/2007 |
| DE | 20 2009 006 921 U1 | 9/2009 |
| EP | 3 299 215 A1 | 3/2018 |
| FR | 2 431 272 A1 | 2/1980 |
| JP | 2003-400 A | 1/2003 |
| JP | 2015-160457 | 9/2015 |
| JP | 2018-43672 | 3/2018 |
| WO | WO 2010/041894 A2 | 4/2010 |

* cited by examiner

VEHICLE SEAT

CROSS REFERENCE TO RELATED APPLICATIONS

The present application claims the benefit of priority to Japanese Patent Application No. 2017-198244 filed on Oct. 12, 2017 with the Japanese Patent Office, the entire contents of which are incorporated herein by reference in its entirety.

BACKGROUND

Field of the Disclosure

Embodiments of the present application relate to a vehicle seat.

Discussion of the Related Art

A vehicle seat taught by US 2015/0239381 A1 comprises a net attached to a seat backrest frame, a ring-shaped connection member having a plurality of string holes that is located higher than a vertical center of the seat backrest frame, and flexible string members arranged radially between the seatback frame and the connection member to form a net serving as a backrest.

According to the teachings of US 2015/0239381 A1, the strings are attached directly to the seat backrest frame. Therefore, in order to adjust flexibility or tension of the backrest in the vehicle seat taught by US 2015/0239381 A1, the strings has to be detached from the seatback frame and attached to the seatback frame again. Thus, in the vehicle seat taught by US 2015/0239381 A1, it is not easy to adjust flexibility or tension of the backrest. In order to adjust flexibility or tension of the backrest easily, for example, a plurality of spare seatback frames using strings respectively having different flexibilities may be prepared as attachments. In this case, flexibility of the backrest may be changed by merely attaching the attachment to the seatback frame. In this case, however, rigidity or strength of the seatback frame may be insufficient to support the weight of the attachment including the nets and the frame.

SUMMARY

Aspects of the present application have been conceived noting the foregoing technical problems, and it is therefore an object of the present application to provide a vehicle seat in which a net structure may be attached easily to a frame while ensuring rigidity of the seatback frame.

Embodiments of the present disclosure relate to a vehicle seat in which a net structure is drawn within a seat frame to support an occupant's body. In order to achieve the above-explained objective, according to at least one embodiment of the present disclosure, at least a portion of the seat frame includes a net frame in which the net structure is drawn, a receiving frame formed integrally with the seat frame, and a fastening mechanism that fastens the net frame to the receiving frame.

In a non-limiting embodiment, the receiving frame may have an L-shaped cross-section, and an opening toward the net frame, and the opening may be closed by the net frame.

In a non-limiting embodiment, the vehicle seat may further comprise a reinforcement member formed on an inner surface of the receiving frame facing to the net frame. The net frame may include a flange to which the reinforcement member is contacted. In addition, the net frame may be combined with the receiving frame such that the flange is brought into contact to the reinforcement member and fastened by the fastening mechanism.

In a non-limiting embodiment, the vehicle seat may further comprise a sheet member that covers the net structure, and a clearance formed between a portion of the receiving frame and the net frame. An outer edge of the sheet member may be inserted into the clearance.

In a non-limiting embodiment, the vehicle seat may further comprise another reinforcement member formed on an opposite surface of the receiving frame to the surface on which the reinforcement member is formed. Another reinforcement member may include a fitting groove, and an outer edge of the sheet member may be inserted into the fitting groove.

In a non-limiting embodiment, the vehicle seat may further comprise a bulged portion thicker than the clearance, that is formed on at least a portion of the outer edge of the sheet member.

Thus, according to the embodiments of the present disclosure, the seat frame includes the net frame in which the net structure is drawn and the receiving frame formed integrally with the seat frame, and the net frame is fastened to the receiving frame by the fastening mechanism. According to the embodiments of the present disclosure, therefore, a desired rigidity of the seat frame may be ensured by combining the net frame with the receiving frame. In other words, it is not necessary to enhance the rigidity of each frame. For these reasons, each frame may be processed easily while ensuring the rigidity. In addition, a cost of material of the frames may be reduced. Further, the net structure may be formed within the net frame in advance. In other words, each frame may be assembled into a unit. According to the embodiments of the present disclosure, the net structure may be attached easily to the vehicle seat and replaced easily.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

First Embodiment

Figure 1:
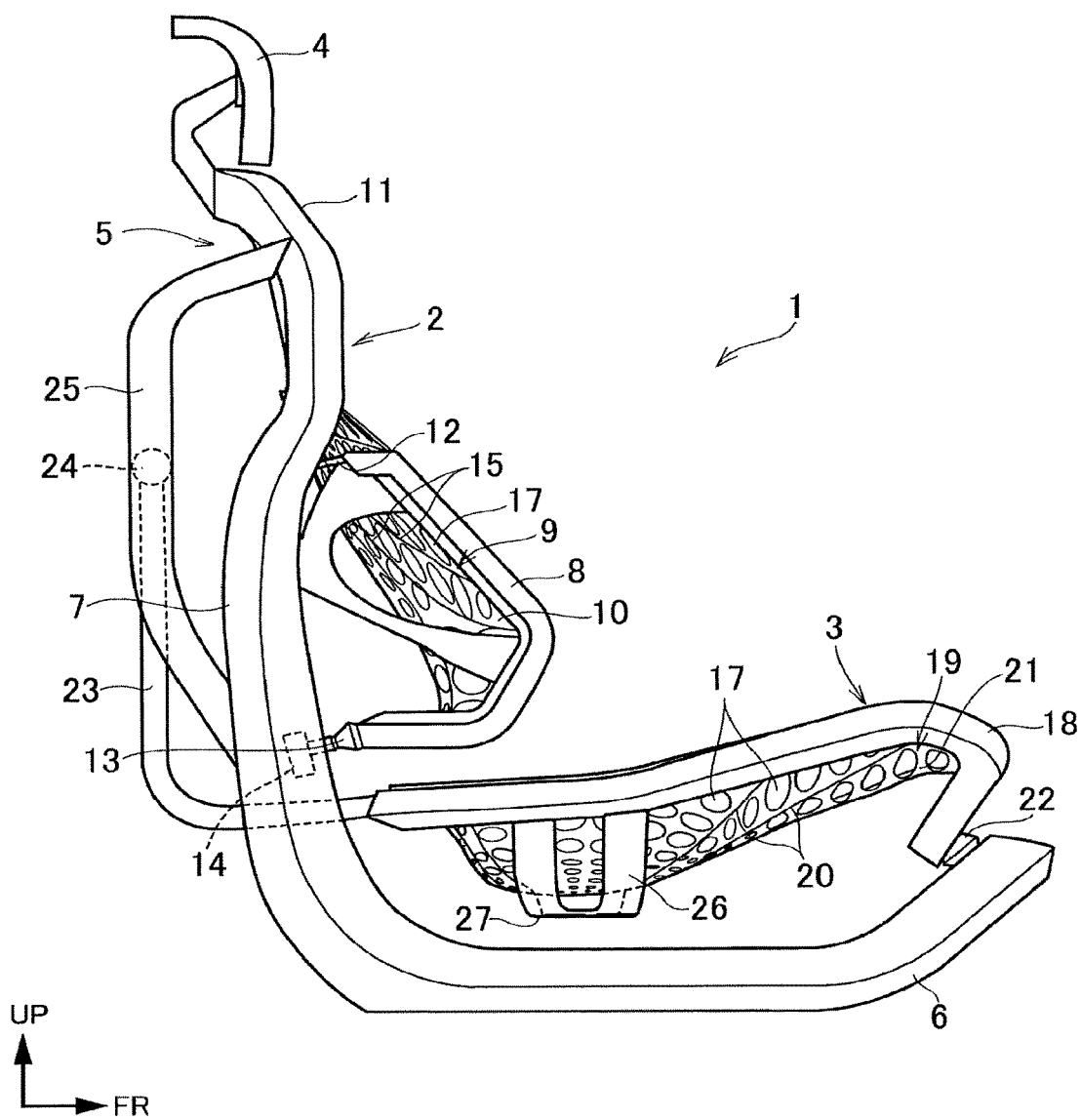
FIG. 1 is a side view showing the vehicle seat according to at least one embodiment of the present disclosure.

Preferred embodiments of the present disclosure will now be explained with reference to the accompanying drawings. The embodiments of the present disclosure relate to a so-called "net seat" in which a net structure for supporting an occupant's body is attached to a frame formed of a plurality of parts. Turning now to FIG. 1, there is shown a seat 1 according to the first embodiment of the present disclosure. The seat 1 is contoured to hold one person, and is used not only as a driver's seat but also as a passenger's seat, e.g., a front passenger seat. The seat 1 comprises a seatback 2 for supporting an occupant's back, a seat base 3 on which the occupant sits, and a headrest 4 attached to an upper lateral portion of the seatback 2. The seat 1 is mounted on a pair of rails (not shown) so that a longitudinal position of the seat 1 is adjustable in a vehicle compartment.

A main frame 5 of the seat 1 comprises a pedestal frame 6 mounted on the rails, and a seatback frame 7 erected from a rear end of the pedestal frame 6. According to the embodiment shown in FIG. 1, the pedestal frame 6 and the seatback frame 7 are formed integrally to form the main frame 5.

The seatback 2 comprises the seatback frame 7 for holding a back of the occupant, a sub-frame 8 suspended from the seatback frame 7 to hold a lumbosacral area of the occupant while being allowed to swivel in accordance with a twisting motion of the occupant, and a first net structure 9 expanding within an upper portion of the seatback frame 7 and the sub-frame 8 to serve as a backrest. The first net structure 9 is covered by a first sheet member 10. A headrest 4 is attached to an upper portion 11 of the seatback frame 7 that is contoured along shoulders of the occupant.

Figure 2:
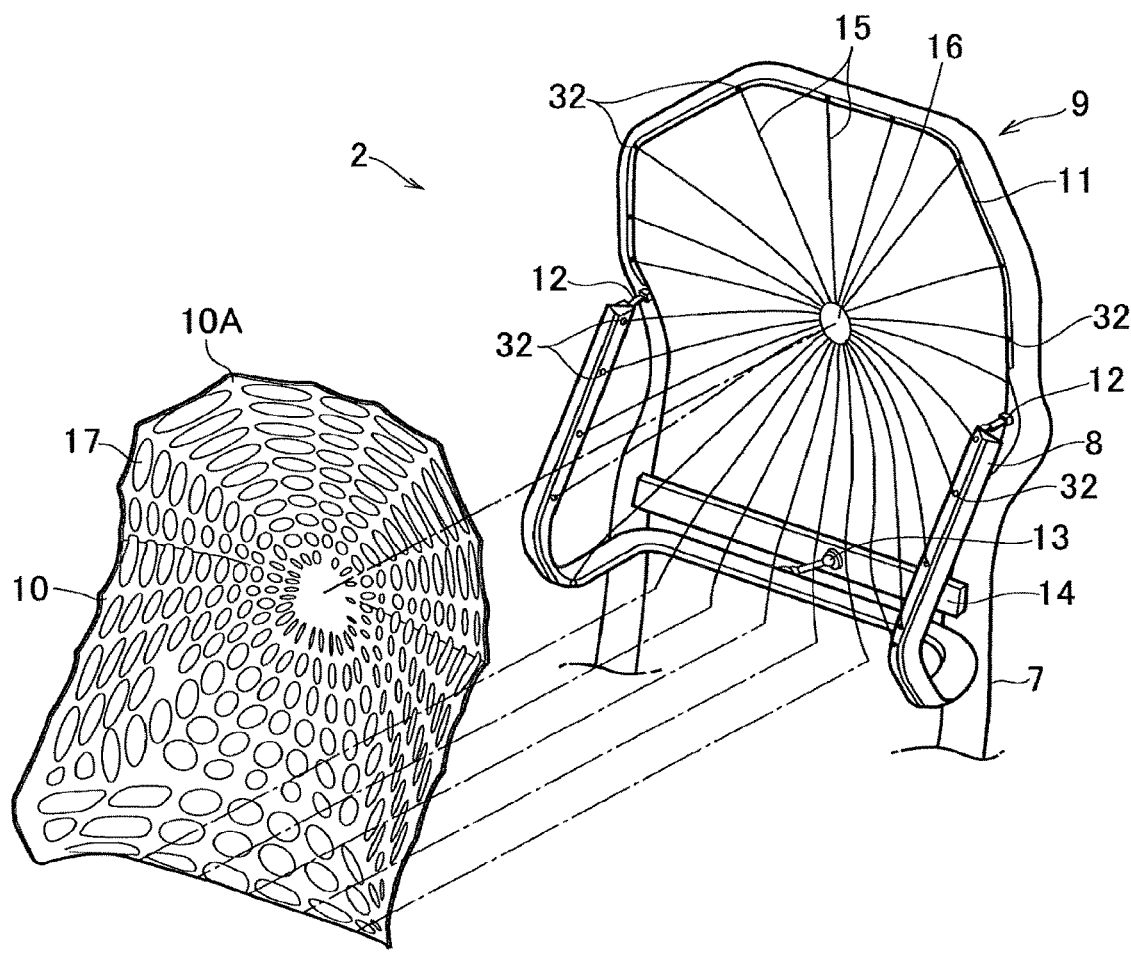
FIG. 2 is an exploded perspective view showing parts of the seatback according to at least one embodiment of the present disclosure.

As depicted in FIG. 2, the sub-frame 8 is a U-shaped member in which a lower lateral portion is withdrawn backwardly. Each upper end of the sub-frame 8 is individually attached to a front face of each longitudinal portion of the seatback frame 7 slightly above an intermediate level through a first connection member 12 such as a blade spring. A lateral reinforcement 14 extends between the longitudinal portions of the seatback frame 7 at a lower level, and an intermediate portion of the lower lateral portion of the sub-frame 8 is connected to the lateral reinforcement 14 through a second connection member 13 such as a ball joint. Thus, the sub-frame 8 is attached to the seatback frame 7 in such a manner as to absorb longitudinal load applied from the occupant while being allowed to swivel in accordance with a twisting motion of the occupant.

The first net structure 9 comprises a plurality of strings 15 drawn radially between a hub ring 16 and the upper portion 11 of the seatback frame 7 and the sub-frame 8. The hub ring 16 is situated behind a spine of the occupant at width center of the seatback frame 7 slightly above the intermediate level.

The first sheet member 10 as a mesh member having a plurality of holes 17 formed in a predetermined geometric pattern is attached to the first net structure 9 from the front side. The first sheet member 10 is outlined along the upper portion 11 of the seatback frame 7 and the sub-frame 8, and as explained later, an outer edge 10A of the first sheet member 10 is attached at least partially to the upper portion 11 of the seatback frame 7 and the sub-frame 8.

As illustrated in FIG. 1, the seat base 3 for sustaining the thigh and hip area of the occupant comprises a substantially rectangular seat base frame 18, and a second net structure 19 drawn within the seat base frame 18. The second net structure 19 also comprises a plurality of strings 20 drawn within the seat base frame 18 in a predetermined pattern, and is also covered by a second sheet member 21. The second sheet member 21 is outlined along the seat base frame 18 and as explained later, an outer edge 21A of the second sheet member 21 is attached at least partially to the seat base frame 18.

The seat base frame 18 is attached to the pedestal frame 6 of the main frame 5 in a pivotal manner. Specifically, a front center of the seat base frame 18 is connected to a front center of the pedestal frame 6 in a pivotal manner through a third connection member 22 such as a ball joint, and a rear center of the seat base frame 18 is connected to the seatback frame 7 through an L-shaped pivot shaft 23. In order to suspend the pivot shaft 23 in a pivotal manner, a rear support 25 is attached to the seatback frame 7 from behind. To this end, a fourth connection member 24 also as a ball joint is fixed in the rear support 25 at a predetermined level and in a width center of the seatback frame 7. An upper end of the pivot shaft 23 is connected to the fourth connection member 24 in a pivotal manner, and a lower end of the pivot shaft 23 is connected to the rear center of the seat base frame 18 in a pivotal manner. In the seat 1, therefore, the seat base frame 18 is allowed to pivot around the virtual axis between the third connection member 22 and the fourth connection member 24 with a twisting motion or a swiveling motion of the lumbosacral area of the occupant.

In order to support ischial area of the occupant, a bottom frame 26 is attached to the seat base frame 18 from below in such a manner as to extend laterally between a right longitudinal portion and a left longitudinal portion of the seat base frame 18. A portion of the second net structure 19 supporting an ischial bone of the occupant is pulled downwardly by a vertical string 27 to be contoured along the thigh and hip area of the occupant. Specifically, the vertical string 27 is drawn in the vertical direction between the portion of the second net structure 19 supporting the ischial bone and the bottom frame 26. Accordingly, the seatback frame 7, the sub-frame 8, and the seat base frame 18 serve as the seat frame of the embodiment.

Figure 3:
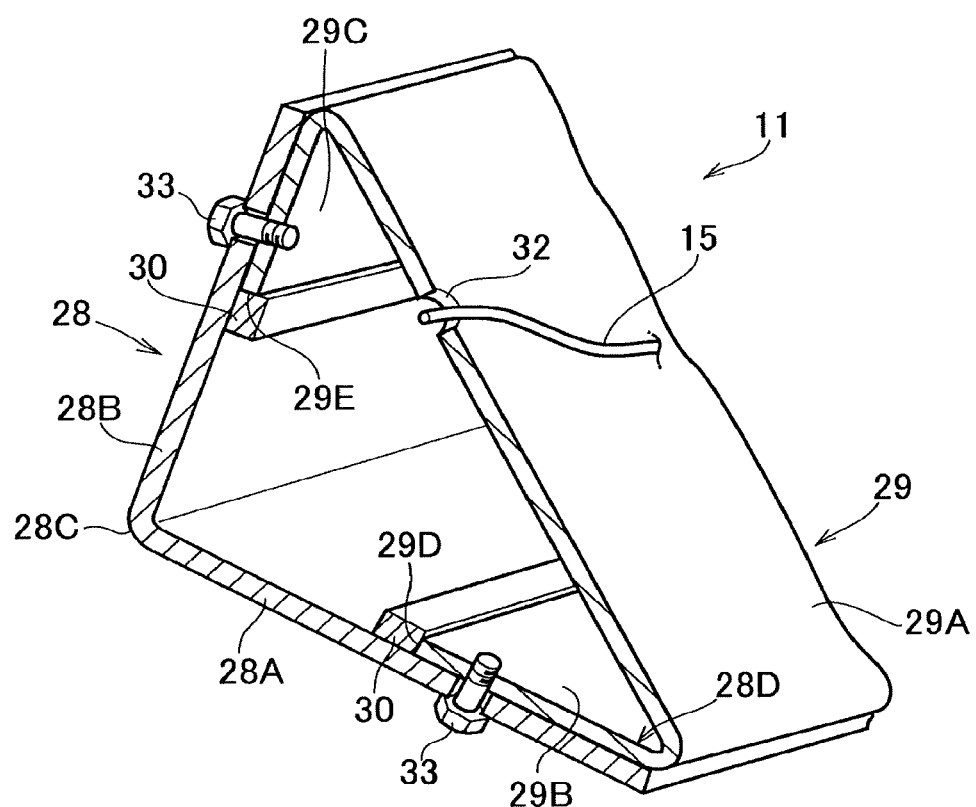
FIG. 3 is a partial perspective view showing a cross-section of a predetermined portion in an upper portion of the seatback frame according to the first embodiment of the present disclosure.
Figure 4:
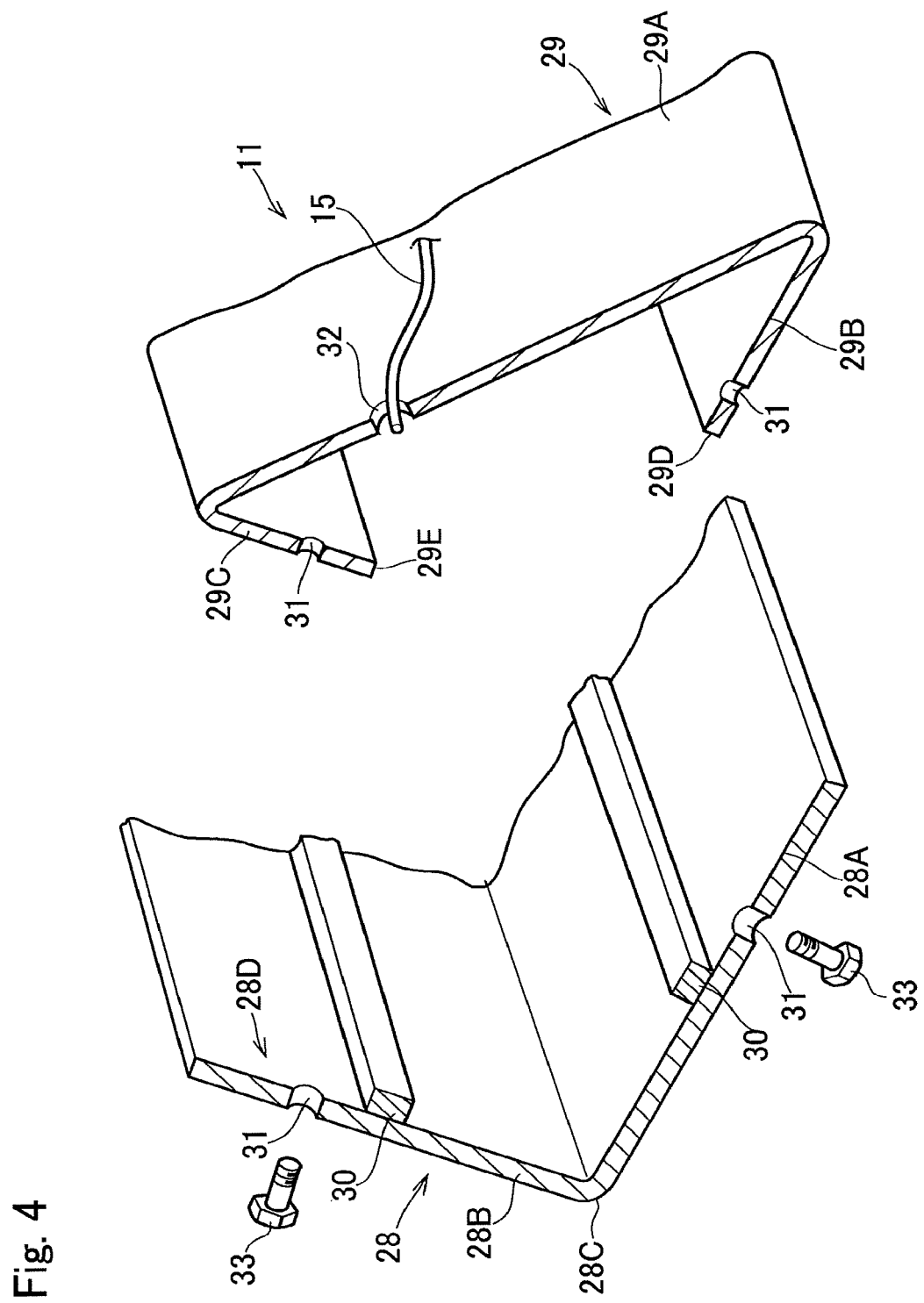
FIG. 4 is an exploded perspective view showing the upper portion of the seatback frame shown in FIG. 3.

A structure of the upper portion 11 of the seatback frame 7 is shown in FIGS. 3 and 4 in more detail. Specifically, FIG. 3 shows a cross-section of the upper portion 11 of the seatback frame 7 at a predetermined portion. As illustrated in FIG. 4, the upper portion 11 of the seatback frame 7 is a two-part frame having a triangular cross-section. Specifically, the upper portion 11 of the seatback frame 7 comprises a first outer frame 28 as a receiving frame and a first inner frame 29 as a net frame combined with the first outer frame 28 in a detachable manner.

The first outer frame 28 having an L-shaped cross-section is formed integrally with the upper portion 11 of the seatback frame 7, and as illustrated in FIGS. 3 and 4, the first outer frame 28 opens toward the first inner frame 29. The first outer frame 28 comprises a first wall portion 28A as base wall, and a second wall portion 28B extending obliquely upwardly. In order to enhance rigidity of the first outer frame 28, a first rib 30 as a reinforcement member is provided respectively on an inner surface of the first wall portion 28A facing to the first inner frame 29, and an inner surface of the second wall portion 28B facing to the first inner frame 29. Specifically, the first ribs 30 extend lengthwise on the inner surface of the first wall portion 28A and the inner surface of the second wall portion 28B across a corner 28C. For example, the rib 30 formed on the second wall portion 28B of the first outer frame 28 may be divided lengthwise into a plurality of pieces at regular intervals. Optionally, the rib 30 formed on the first wall portion 28A of the first outer frame 28 may also be divided lengthwise into a plurality of pieces at regular intervals. A plurality of bolt holes 31 are formed on the first wall portion 28A and the second wall portion 28B outside of the first ribs 30.

An opening 28D of the first outer frame 28 is closed by the first inner frame 29. That is, the first inner frame 29 is situated in front of the first outer frame 28 to be contacted to the occupant's body directly or indirectly. In order to enlarge a contact surface 29A of the first inner frame 29 to be contacted to the occupant's body as much as possible, the contact surface 29A is shaped into a flat wall and inclined at a predetermined angle with respect to the occupant's body. A plurality of string holes 32 are formed on the contact surface 29A in such a manner as to penetrate through the contact surface 29A in a thickness direction. The strings 15 are drawn radially between the first inner frame 29 and the hub ring 16 while passing through the string holes 32 thereby forming an upper section of the first net structure 9.

A first flange 29B and a second flange 29C are formed on both sides of the contact surface 29A of the first inner frame 29. Specifically, the first flange 29B is formed by bending one of edge portions of the first inner frame 29 to be parallel to the first wall portion 28A of the first outer frame 28. On the other hand, the second flange 29C is formed by bending the other edge portion of the first inner frame 29 to be parallel to the second wall portion 28B of the first outer frame 28. Accordingly, when the first inner frame 29 is combined with the first outer frame 28, the first flange 29B of the first inner frame 29 is overlapped on the first wall portion 28A of the first outer frame 28, and an edge 29D of the first flange 29B is brought into contact entirely to the first rib 30 formed on the first wall portion 28A. Likewise, when the first inner frame 29 is combined with the first outer frame 28, the second flange 29C of the first inner frame 29 is overlapped on the second wall portion 28B of the first outer frame 28, and an edge 29E of the second flange 29C is brought into contact entirely to the first rib 30 formed on the second wall portion 28B.

In the first inner frame 29, the bolt holes 31 are also formed individually on the first flange 29B and the second flange 29C. When the first inner frame 29 is combined with the first outer frame 28, the bolt hole 31 formed on the first flange 29B is overlapped on the bolt hole 31 formed on the first wall portion 28A, and the bolt hole 31 formed on the second flange 29C is overlapped on the second wall portion 28B. In this situation, a bolt 33 is inserted into each of the bolt holes 31 of the first outer frame 28 and the first inner frame 29 thus overlapped, and a nut (not shown) is screwed onto each of the bolts 33 to fasten the first inner frame 29 to the first outer frame 28. Accordingly, the bolt 33, the bolt hole 31, and the nut etc. serve as the fastening mechanism of the embodiment.

Figure 5:
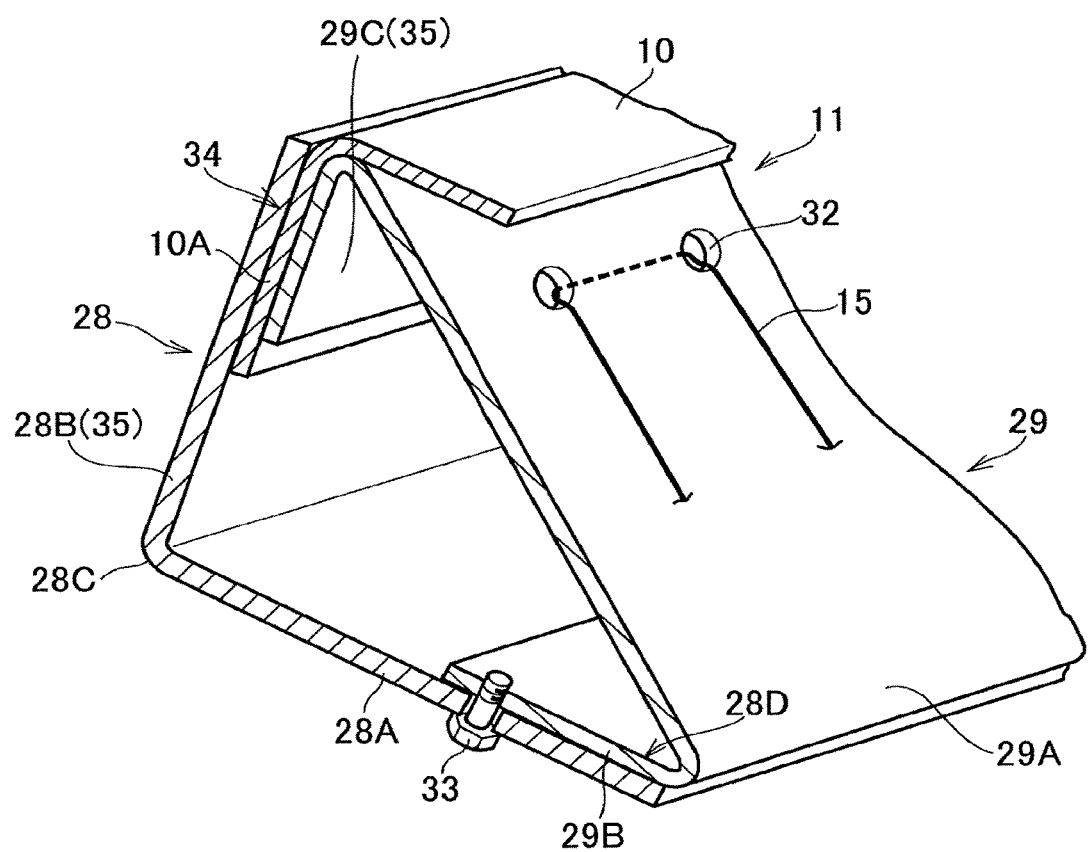
FIG. 5 is a perspective view showing a cross-section of another portion of the upper portion of the seatback frame shown in FIG. 3.

FIG. 5 shows a cross-section of another portion of the upper portion 11 of the seatback frame 7. As illustrated in FIG. 5, a clearance 34 is created between the second wall portion 28B of the first outer frame 28 and the second flange 29C of the first inner frame 29 at least partially. In the example shown in FIG. 5, the clearance 34 is created within the interval between the first ribs 30 extending on the second wall portion 28B of the first outer frame 28 intermittently, and the outer edge 10A of the first sheet member 10 is inserted into the clearance 34. In other words, the outer edge 10A of the first sheet member 10 is sandwiched between the second wall portion 28B of the first outer frame 28 and the second flange 29C of the first inner frame 29. In the example shown in FIG. 5, accordingly, the second wall portion 28B of the first outer frame 28 and the second flange 29C of the first inner frame 29 forming the clearance 34 serve as a clamping member 35. After clamping the outer edge 10A of the first sheet member 10 by the clamping member 35, the first outer frame 28 and the first inner frame 29 are fastened by the bolt 33. Remaining structure is similar to that shown in FIG. 3.

Figure 6:
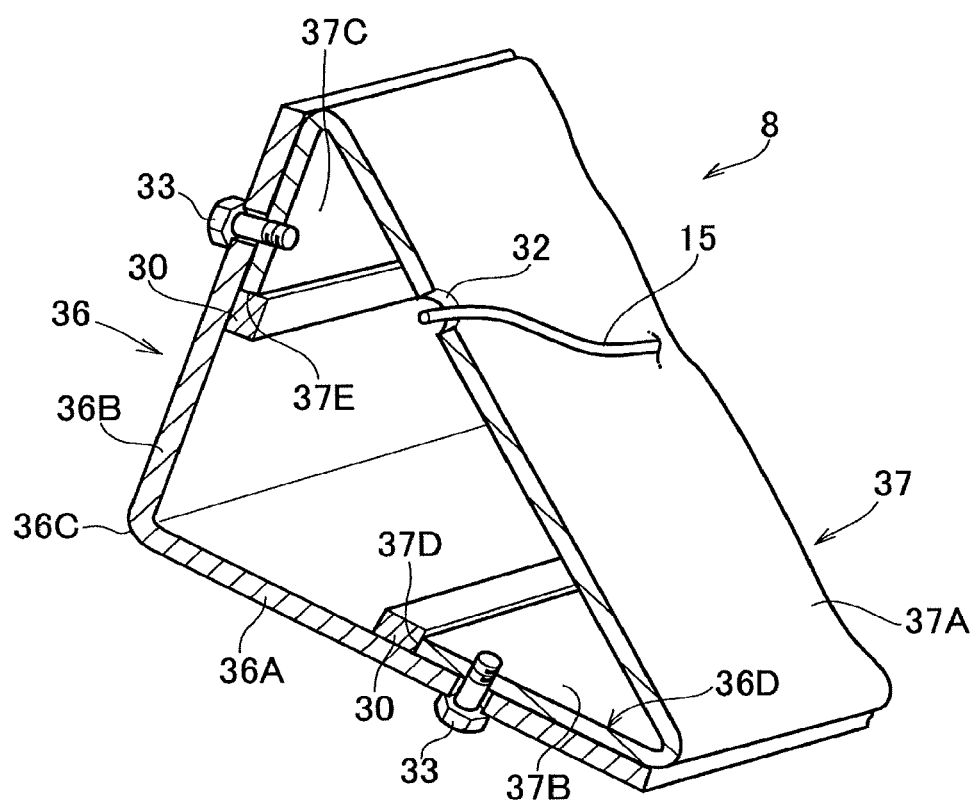
FIG. 6 is a partial perspective view showing a cross-section of a predetermined portion of the sub-frame according to the first embodiment.

As illustrated in FIG. 6, a structure of the sub-frame 8 is similar to that of the upper portion 11 of the seatback frame 7. Specifically, FIG. 6 shows a cross-section of a predetermined portion of the sub-frame 8. The sub-frame 8 is also a two-part frame having a triangular cross-section. Specifically, the sub-frame 8 comprises a second outer frame 36 as a receiving frame and a second inner frame 37 as a net frame combined with the second outer frame 36 in a detachable manner.

As described, the sub-frame 8 is suspended from the seatback frame 7 through the first connection members 12 in a swiveling manner, and the lower lateral portion of the sub-frame 8 is connected to the lateral reinforcement 14 through the second connection member 13. The second outer frame 36 also has an L-shaped cross-section, and the second outer frame 36 opens toward the second inner frame 37. In order to enhance rigidity of the second outer frame 36, the first rib 30 is also formed respectively on an inner surface of a first wall portion 36A facing to the second inner frame 37 and an inner surface of a second wall portion 36B facing to the second inner frame 37. Specifically, the first ribs 30 extend lengthwise on the inner surface of the first wall portion 36A and the inner surface of the second wall portion 36B across a corner 36C. For example, the rib 30 attached to the second wall portion 36B of the second outer frame 36 may be divided lengthwise into a plurality of pieces at regular intervals. Optionally, the rib 30 attached to the first wall portion 36A of the second outer frame 36 may also be divided lengthwise into a plurality of pieces at regular intervals.

An opening 36D of the second outer frame 36 is closed by the second inner frame 37. That is, the second inner frame 37 is situated in front of the second outer frame 36 to be contacted to the occupant's body directly or indirectly. In order to enlarge a contact surface 37A of the second inner frame 37 to be contacted to the occupant's body as much as possible, the contact surface 37A is shaped into a flat wall and inclined at a predetermined angle with respect to the occupant's body. The string holes 32 are also formed on the contact surface 37A in such a manner as to penetrate through the contact surface 37A in a thickness direction. The strings 15 are drawn radially between the second inner frame 37 and the hub ring 16 while passing through the string holes 32 thereby forming a lower section of the first net structure 9. A first flange 37B and a second flange 37C are formed on both sides of the contact surface 37A of the second inner frame 37. Specifically, the first flange 37B is formed by bending one of edge portions of the second inner frame 37 to be parallel to the first wall portion 36A of the second outer frame 36. On the other hand, the second flange 37C is formed by bending the other edge portion of the second inner frame 37 to be parallel to the second wall portion 36B of the second outer frame 36. Accordingly, when the second inner frame 37 is combined with the second outer frame 36, the first flange 37B of the second inner frame 37 is overlapped on the first wall portion 36A of the second outer frame 36, and an edge 37D of the first flange 37B is brought into contact entirely to the first rib 30 attached to the first wall portion 36A. Likewise, when the second inner frame 37 is combined with the second outer frame 36, the second flange 37C of the second inner frame 37 is overlapped on the second wall portion 36B of the second outer frame 36, and an edge 37E of the second flange 37C is brought into contact entirely to the first rib 30 attached to the second wall portion 36B. Remaining structure is similar to that shown in FIG. 3.

Figure 7:
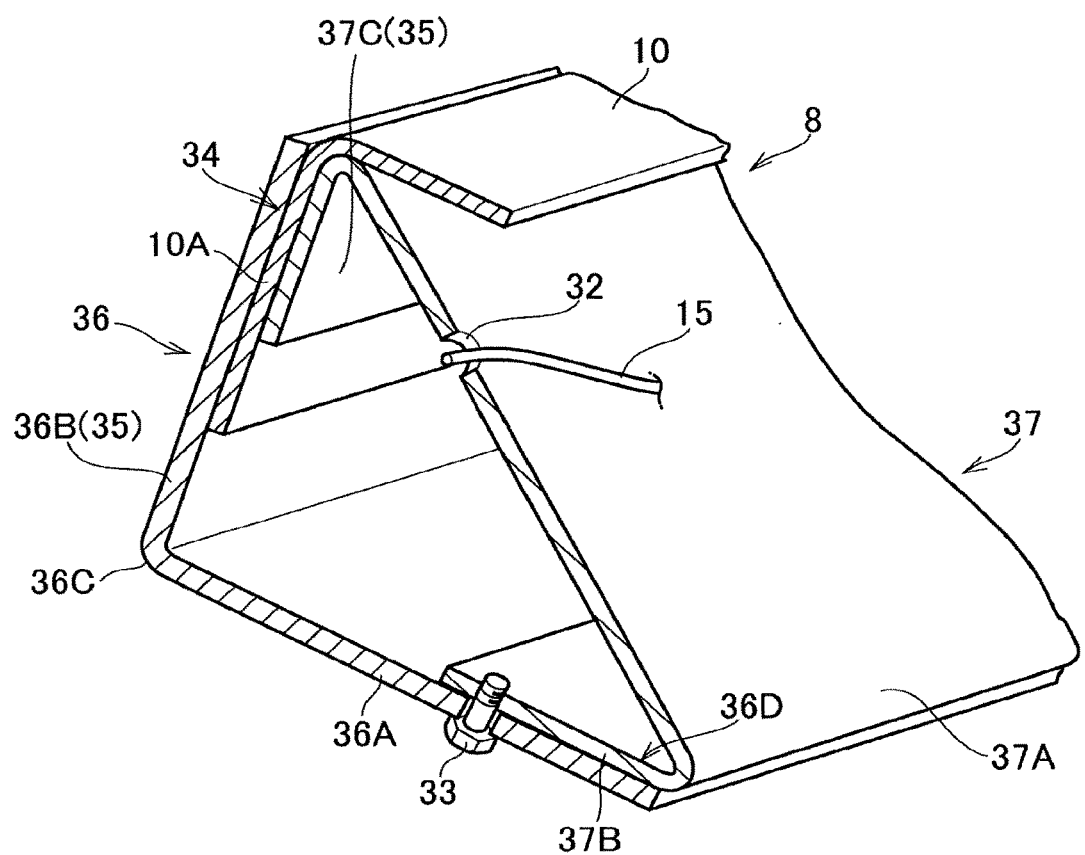
FIG. 7 is a partial perspective view showing a cross-section of another portion of the sub-frame shown in FIG. 6.

FIG. 7 shows a cross-section of another portion of the sub-frame 8. As illustrated in FIG. 7, the clearance 34 is also created between the second wall portion 36B of the second outer frame 36 and the second flange 37C of the second inner frame 37 at least partially. In the example shown in FIG. 7, the clearance 34 is created within the interval between the first ribs 30 extending on the second wall portion 36B of the second outer frame 36 intermittently, and the outer edge 10A of the first sheet member 10 is inserted into the clearance 34. In other words, the outer edge 10A of the first sheet member 10 is sandwiched between the second wall portion 36B of the second outer frame 36 and the second flange 37C of the second inner frame 37. In the example shown in FIG. 7, accordingly, the second wall portion 36B of the second outer frame 36 and the second flange 37C of the second inner frame 37 forming the clearance 34 serve as the clamping member 35. After clamping the outer edge 10A of the first sheet member 10 by the clamping member 35, the second outer frame 36 and the second inner frame 37 are fastened by the bolt 33. Remaining structure is similar to that shown in FIG. 3.

Figure 8:
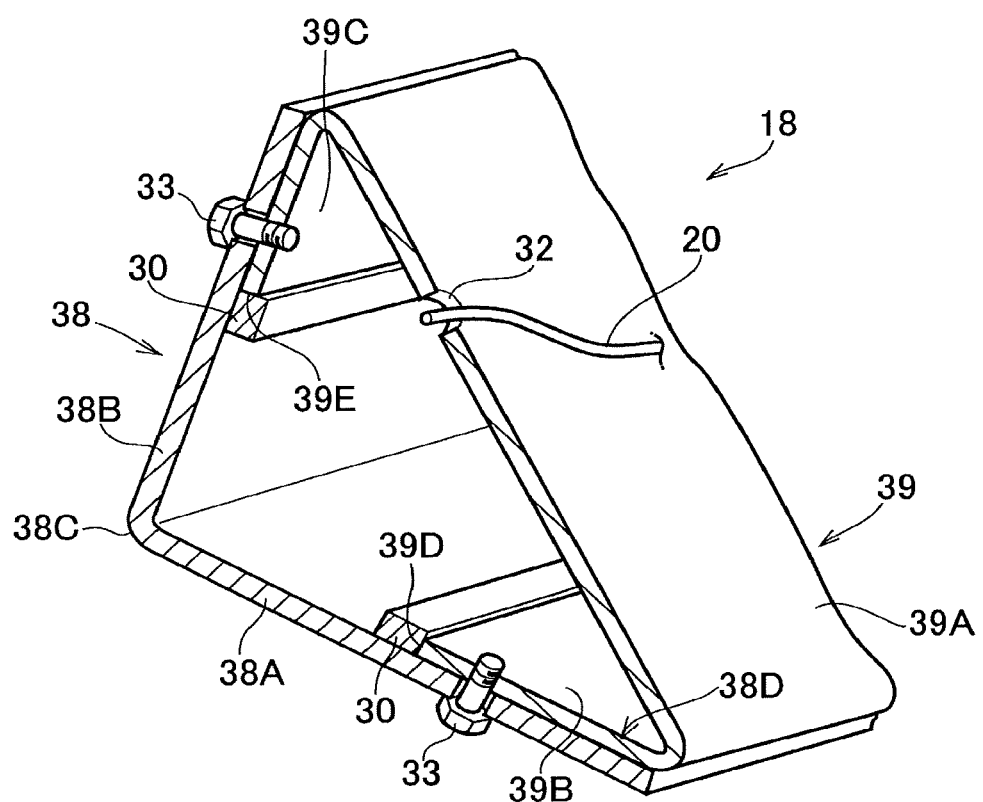
FIG. 8 is a partial perspective view showing a cross-section of a predetermined portion of the seat base frame according to the first embodiment.

A structure of the seat base frame 18 is shown in FIG. 8. Specifically, FIG. 8 shows a cross-section of the seat base frame 18 at a predetermined portion. The seat base frame 18 is also a two-part frame having a triangular cross-section. Specifically, the seat base frame 18 comprises a third outer frame 38 as a receiving frame and a third inner frame 39 as a net frame combined with the third outer frame 38 in a detachable manner.

As described, the third outer frame 38 is attached to the pedestal frame 6 of the main frame 5 in a pivotal manner through the third connection member 22 and the fourth connection member 24. As shown in FIG. 8, the third outer frame 38 also has an L-shaped cross-section. In order to enhance rigidity of the third outer frame 38, the first rib 30 is also formed respectively on an inner surface of a first wall portion 38A facing to the third inner frame 39 and an inner surface of a second wall portion 38B facing to the third inner frame 39. Specifically, the first ribs 30 extend lengthwise on the inner surface of the first wall portion 38A and the inner surface of the second wall portion 38B across a corner 38C. For example, the rib 30 attached to the second wall portion 38B of the third outer frame 38 may be divided lengthwise into a plurality of pieces at regular intervals. Optionally, the rib 30 attached to the first wall portion 38A of the third outer frame 38 may also be divided lengthwise into a plurality of pieces at regular intervals.

An opening 38D of the third outer frame 38 is closed by the third inner frame 39. That is, the third inner frame 39 is contacted to the occupant's body directly or indirectly. In order to enlarge a contact surface 39A of the third inner frame 39 to be contacted to the occupant's body as much as possible, the contact surface 39A is shaped into a flat wall and inclined at a predetermined angle with respect to the occupant's body. A first flange 39B and a second flange 39C are formed on both sides of the contact surface 39A of the third inner frame 39. Specifically, the first flange 39B is formed by bending one of edge portions of the third inner frame 39 to be parallel to the first wall portion 38A of the third outer frame 38. On the other hand, the second flange 39C is formed by bending the other edge portion of the third inner frame 39 to be parallel to the second wall portion 38B of the third outer frame 38. Accordingly, when the third inner frame 39 is combined with the third outer frame 38, the first flange 39B of the third inner frame 39 is overlapped on the first wall portion 38A of the third outer frame 38, and an edge 39D of the first flange 39B is brought into contact entirely to the first rib 30 formed on the first wall portion 38A. Likewise, when the third inner frame 39 is combined with the third outer frame 38, the second flange 39C of the third inner frame 39 is overlapped on the second wall portion 38B of the third outer frame 38, and an edge 39E of the second flange 39C is brought into contact entirely to the first rib 30 formed on the second wall portion 38B. Remaining structure is similar to that shown in FIG. 3.

Figure 9:
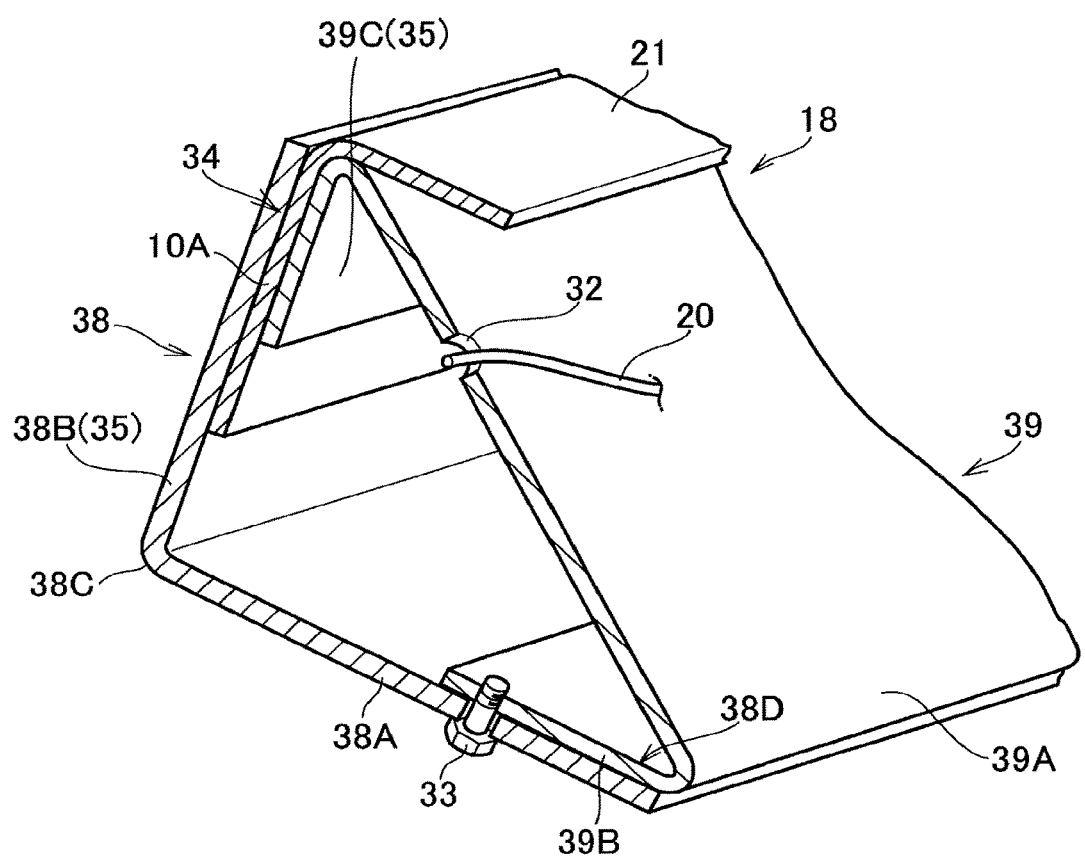
FIG. 9 is a partial perspective view showing a cross-section of another portion of the seat base frame shown in FIG. 8.

FIG. 9 shows a cross-section of another portion of the seat base frame 18. As illustrated in FIG. 9, the clearance 34 is also created between the second wall portion 38B of the third outer frame 38 and the second flange 39C of the third inner frame 39 at least partially. In the example shown in FIG. 9, the clearance 34 is created within the interval between the first ribs 30 extending on the second wall portion 38B of the third outer frame 38 intermittently, and the outer edge 21A of the second sheet member 21 is inserted into the clearance 34. In other words, the outer edge 21A of the second sheet member 21 is sandwiched between the second wall portion 38B of the third outer frame 38 and the second flange 39C of the third inner frame 39. In the example shown in FIG. 9, accordingly, the second wall portion 38B of the third outer frame 38 and the second flange 39C of the third inner frame 39 forming the clearance 34 serve as the clamping member 35. After clamping the outer edge 21A of the second sheet member 21 by the clamping member 35, the third outer frame 38 and the third inner frame 39 are fastened by the bolt 33. Remaining structure is similar to that shown in FIG. 3.

Here will be explained an assembling work of the seatback 2. First of all, the strings 15 are drawn radially between the first inner frame 29 of the upper portion 11 of the seatback frame 7 and the hub ring 16 and between the second inner frame 37 of the sub-frame 8 and the hub ring 16 to form the first net structure 9. Then, the first inner frame 29 is combined with the first outer frame 28 in such a manner as to bring the edge 29D of the first flange 29B into contact to the first rib 30 formed on the first wall portion 28A, and bring the edge 29E of the second flange 29C into contact to the first rib 30 formed on the second wall portion 28B. Consequently, the bolt hole 31 formed on the first flange 29B is overlapped on the bolt hole 31 formed on the first wall portion 28A, and the bolt hole 31 formed on the second flange 29C is overlapped on the second wall portion 28B. Likewise, the second inner frame 37 of the sub-frame 8 is combined with the second outer frame 36 of the sub-frame 8 in such a manner as to bring the edge 37D of the first flange 37B into contact to the first rib 30 attached to the first wall portion 36A, and bring the edge 37E of the second flange 37C into contact to the first rib 30 attached to the second wall portion 36B. Consequently, the bolt hole 31 formed on the first flange 37B is overlapped on the bolt hole 31 formed on the first wall portion 36A, and the bolt hole 31 formed on the second flange 37C is overlapped on the second wall portion 36B. Then, the outer edge 10A of the first sheet member 10 is inserted into the clearance 34 between the second wall portion 28B of the first outer frame 28 and the second flange 29C of the first inner frame 29, and between the second wall portion 36B of the second outer frame 36 and the second flange 37C of the second inner frame 37. Thereafter, the bolts 33 are inserted into the into the bolt holes 31, and nuts are screwed onto each of the bolts 33 to fasten the first sheet member 10 to the upper portion 11 of the seatback frame 7 and to the sub-frame 8.

Next, an assembling work of the seat base 3 will be explained hereinafter. First of all, the strings 20 are drawn within the third inner frame 39 while passing through the string holes 32 to form the second net structure 19. Then, the third inner frame 39 is combined with the third outer frame 38 in such a manner as to bring the edge 39D of the first flange 39B into contact to the first rib 30 formed on the first wall portion 38A, and bring the edge 39E of the second flange 39C into contact to the first rib 30 formed on the second wall portion 38B. Consequently, the bolt hole 31 formed on the first flange 39B is overlapped on the bolt hole 31 formed on the first wall portion 38A, and the bolt hole 31 formed on the second flange 39C is overlapped on the second wall portion 38B. Then, the outer edge 21A of the second sheet member 21 is inserted into the clearance 34 between the second wall portion 38B of the third outer frame 38 and the second flange 39C of the third inner frame 39. Thereafter, the bolts 33 are inserted into the into the bolt holes 31, and nuts are screwed onto each of the bolts 33 to fasten the second sheet member 21 to the seat base frame 18.

Thus, in the seat 1 according to the first embodiment, the first ribs 30 are formed on the inner surfaces of the first outer frame 28, the second outer frame 36, and the third outer frame 38 to enhance rigidities of the seatback frame 7, the sub-frame 8, and the seat base frame 18. In addition, each of the edges of the first inner frame 29, the second inner frame 37, and the third inner frame 39 are contacted to the first ribs 30 after assembling the seatback frame 7, the sub-frame 8, and the seat base frame 18. According to the embodiment, therefore, the seatback frame 7, the sub-frame 8, and the seat base frame 18 may be assembled tightly to further enhance the rigidities of those frames. In addition, each of the net structures 9, 19 may be formed easily before combining the inner frames 29, 37, 39 with the outer frames 28, 36, 38. Further, flexibility or tension of the net structures 9, 19 may be adjusted easily by using strings having a desired flexibility or tension to form the net structures 9, 19.

Second Embodiment

Figure 10:
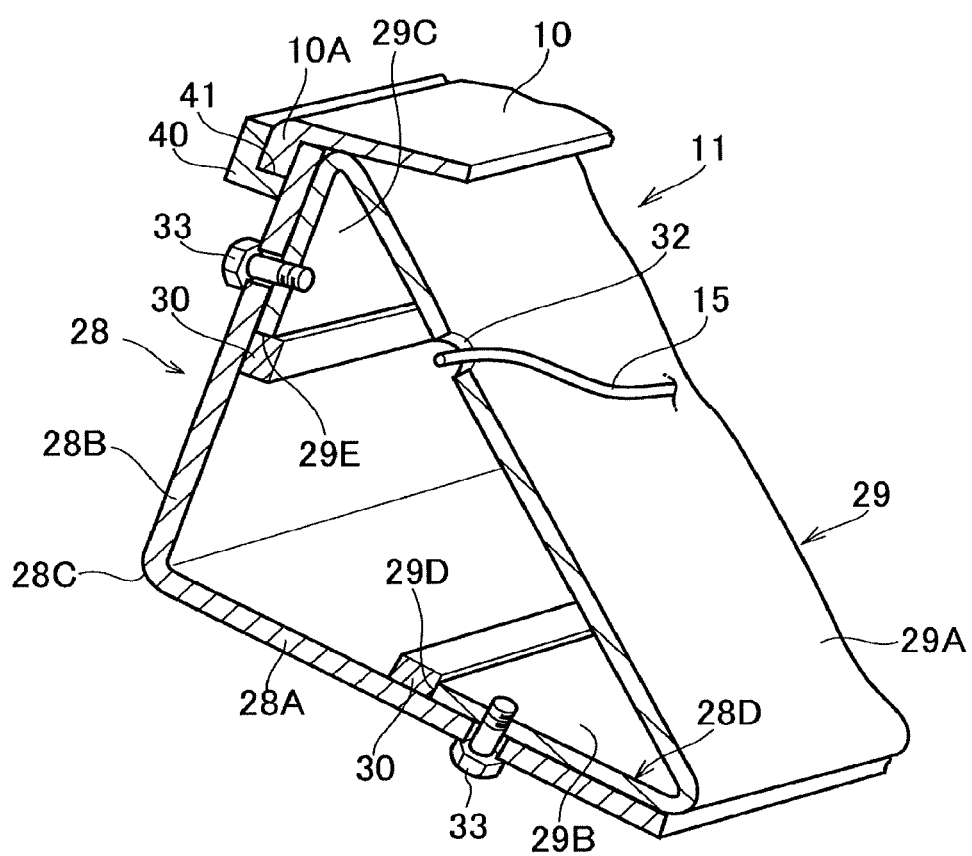
FIG. 10 is a partial perspective view showing a cross-section of an upper portion of the seatback frame according to the second embodiment of the present disclosure.

Turning to FIG. 10, there is shown a cross-section of the upper portion 11 of the seatback frame 7 according to the second embodiment at a predetermined portion. As illustrated in FIG. 10, according to the second embodiment, a second rib 40 as another reinforcement member is attached to or formed on an outer surface of the first outer frame 28 to further enhance rigidity of the first outer frame 28. Specifically, the second rib 40 is formed lengthwise on the outer surface of the second wall portion 28B of the first outer frame 28 opposite to the inner surface on which the first rib 30 is formed. The second rib 40 includes a fitting groove 41 to which the outer edge 10A of the first sheet member 10 is inserted at least partially. Remaining structure is similar to that shown in FIG. 3.

Figure 11:
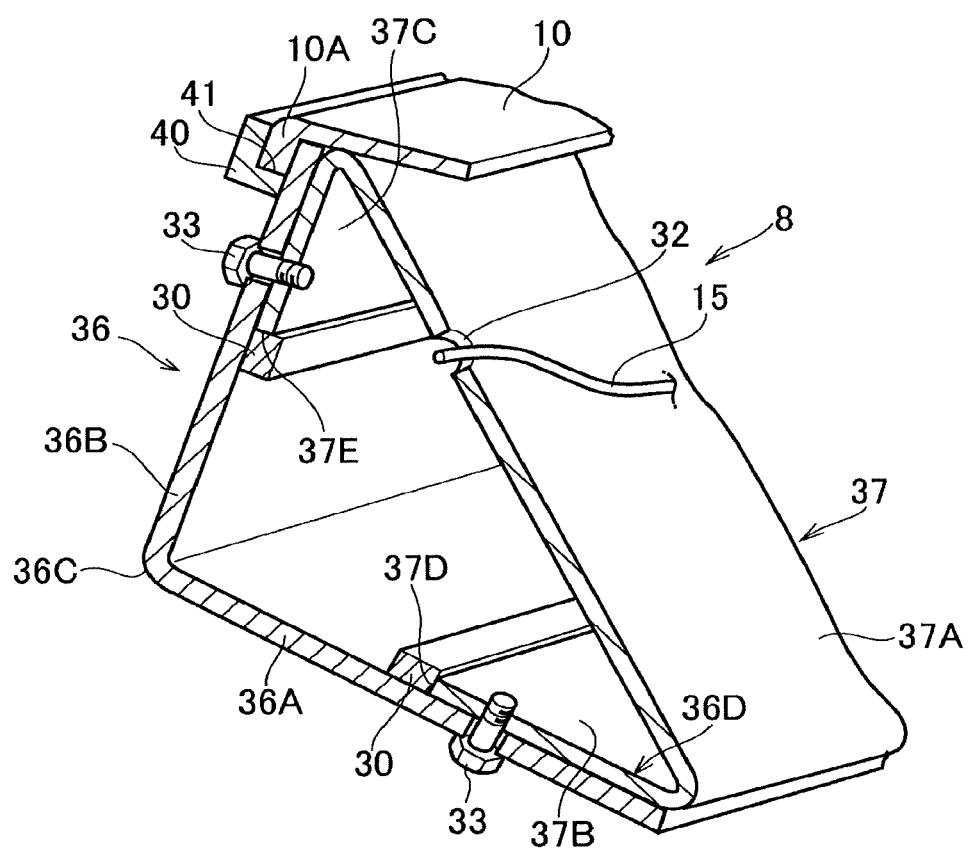
FIG. 11 is a partial perspective view showing a cross-section of the sub-frame according to the second embodiment.

FIG. 11 shows a cross-section of the sub-frame 8 according to the second embodiment. As illustrated in FIG. 11, the second rib 40 is also is attached to or formed on an outer surface of the second outer frame 36 to further enhance rigidity of the second outer frame 36. Specifically, the second rib 40 is formed lengthwise on the outer surface of the second wall portion 36B of the second outer frame 36 opposite to the inner surface on which the first rib 30 is formed. Remaining structure is similar to that shown in FIG. 3.

Figure 12:
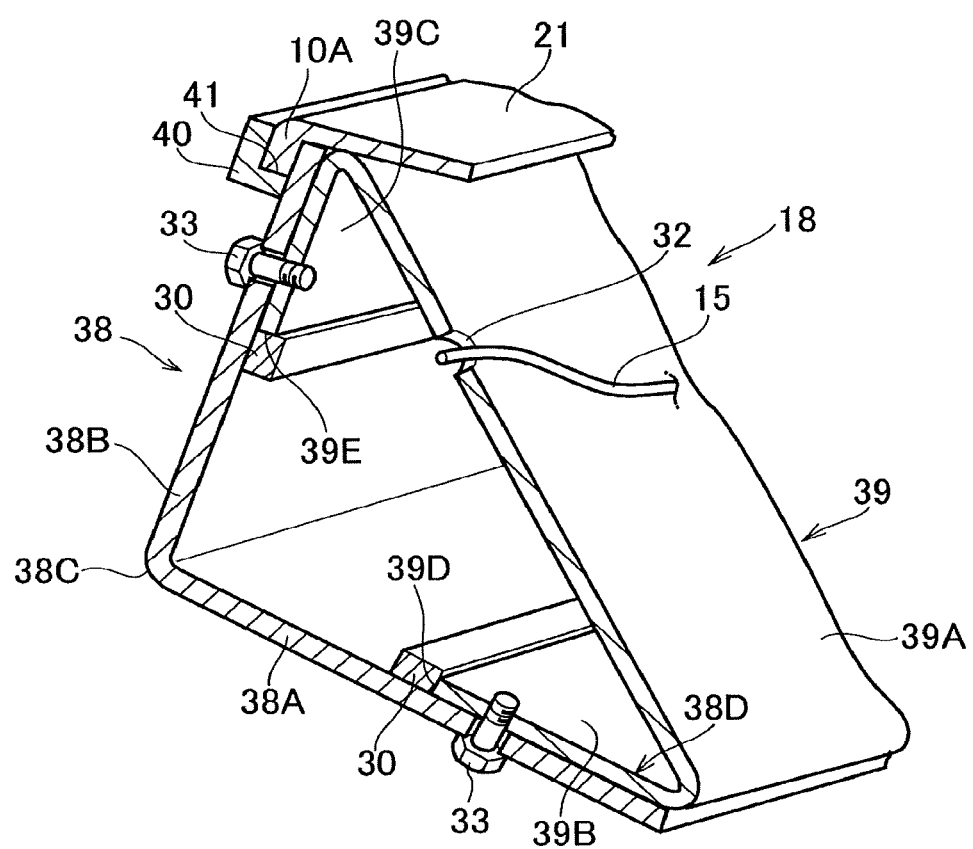
FIG. 12 is a partial perspective view showing a cross-section of the seat base frame according to the second embodiment.

FIG. 12 shows a cross-section of the seat base frame 18 according to the second embodiment. As illustrated in FIG. 12, the second rib 40 is also is attached to or formed on an outer surface of the third outer frame 38 to further enhance rigidity of the third outer frame 38. Specifically, the second rib 40 is formed lengthwise on the outer surface of the second wall portion 38B of the third outer frame 38 opposite to the inner surface on which the first rib 30 is formed. Remaining structure is similar to that shown in FIG. 3.

Thus, in the seat 1 according to the second embodiment, the second ribs 40 are formed on the inner surfaces of the first outer frame 28, the second outer frame 36, and the third outer frame 38 to further enhance rigidities of the seatback frame 7, the sub-frame 8, and the seat base frame 18. In addition, the outer edge 10A of the first sheet member 10 may be fitted easily into the fitting groove 41 of the seatback frame 7 and the sub-frame 8 after combining the first inner frame 29 with the first outer frame 28 and the second inner frame 37 with the second outer frame 36. Likewise, the outer edge 21A of the second sheet member 21 may be fitted easily into the fitting groove 41 of the seat base frame 18 after combining the third inner frame 39 with the third outer frame 38. That is, the first sheet member 10 may be attached detachably to the seatback frame 7 and the sub-frame 8, and the second sheet member 21 may be attached detachably to the seat base frame 18. According to the second embodiment, therefore, the first sheet member 10 and the second sheet member 21 may be replaced easily.

Although the above exemplary embodiments of the present disclosure have been described, it will be understood by those skilled in the art that the present disclosure should not be limited to the described exemplary embodiments, but that various changes and modifications can be made within the scope of the present disclosure.

Figure 13:
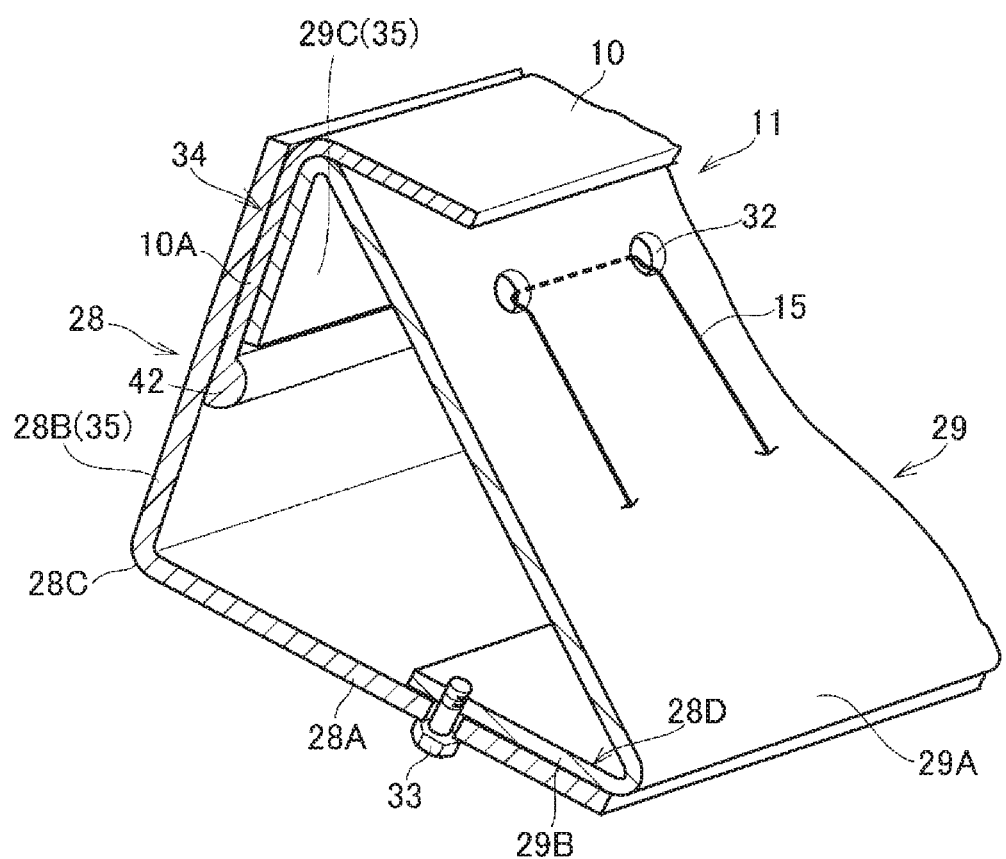
FIG. 13 is a perspective view showing a cross-section of another portion of the upper portion of the seatback frame according to the second embodiment.
Figure 14:
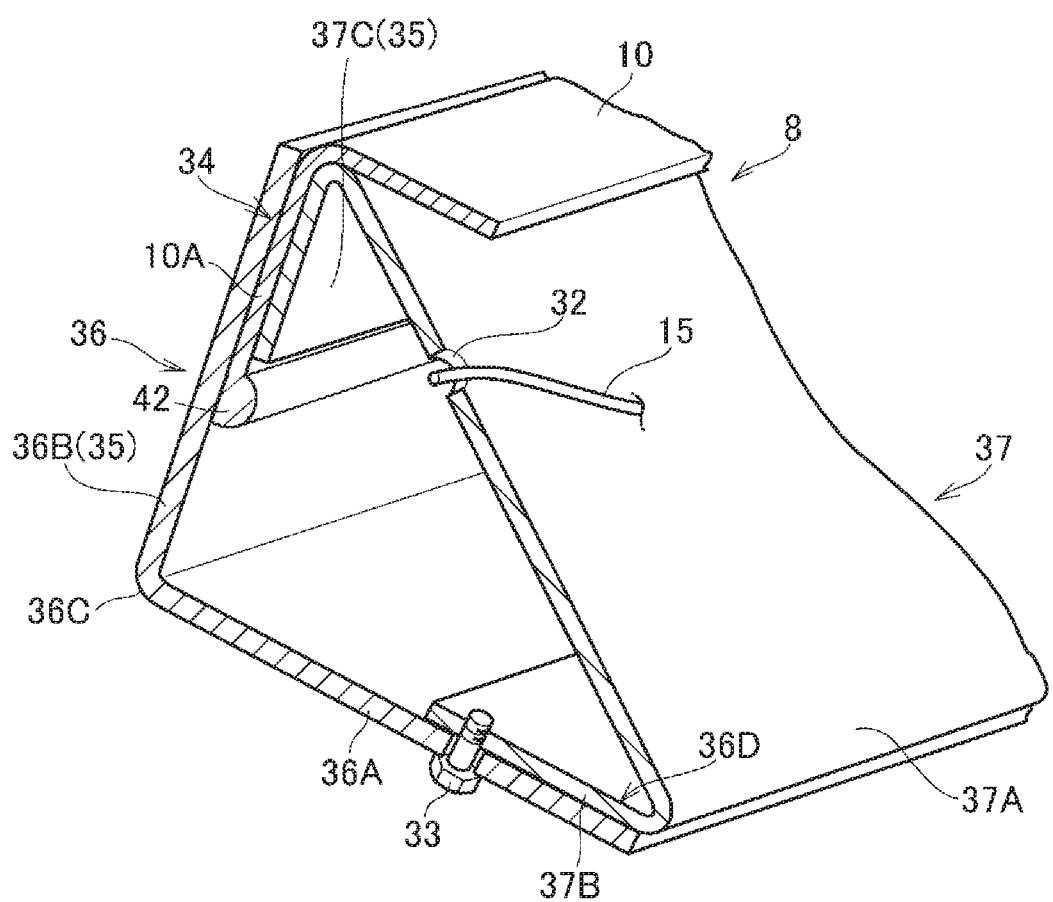
FIG. 14 is a partial perspective view showing a cross-section of another portion of the sub-frame according to the second embodiment.
Figure 15:
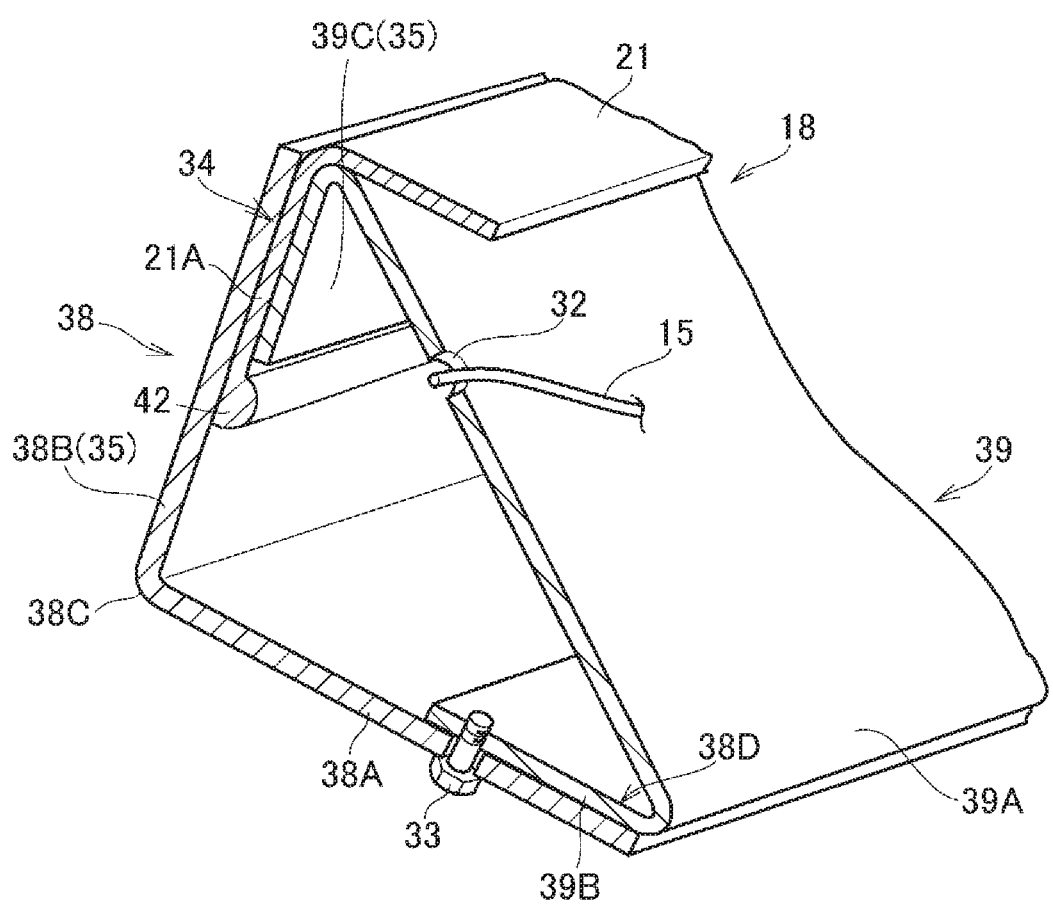
FIG. 15 is a partial perspective view showing a cross-section of another portion of the seat base frame according to the second embodiment.

For example, as shown in FIG. 13-15, in order to prevent detachment of the sheet members 10, 21 from the frames, a thickness of each of the outer edges 10A, 21A may be increased partially to form a bulged portion 42 that is thicker than a clearance 34. In addition, cross-sectional shapes of the seatback frame 7, the sub-frame 8, and the seat base frame 18 should not be limited to the triangular shape. For example, the seatback frame 7, the sub-frame 8, and the seat base frame 18 may also be shaped to have a rectangular cross-section or a circular cross-section. Further, the seatback frame 7, the sub-frame 8, and the seat base frame 18 may also be a three-or-more-part frame respectively.

What is claimed is:

1. A vehicle seat in which a net structure is drawn within a seat frame to support an occupant's body, wherein at least a portion of the seat frame includes:
   a net frame in which the net structure is drawn;
   a receiving frame formed integrally with the seat frame; and
   a fastening mechanism that fastens the net frame to the receiving frame,
   wherein the receiving frame has an L-shaped cross-section, and an opening opened toward the net frame, the opening being closed by the net frame,
   wherein a first reinforcement member is formed on an inner surface of the receiving frame facing to the net frame, the first reinforcement member extending along a lengthwise direction of the receiving frame,
   wherein the net frame includes a first flange to which the first reinforcement member is contacted, and
   wherein the net frame is combined with the receiving frame such that the first flange is brought into contact to the first reinforcement member and fastened by the fastening mechanism.

2. The vehicle seat as claimed in claim 1, further comprising:
   a sheet member that covers the net structure; and
   a clearance formed between a portion of the receiving frame and the net frame,
   wherein an outer edge of the sheet member is inserted into the clearance.

3. The vehicle seat as claimed in claim 2, further comprising:
   a bulged portion thicker than the clearance, that is formed on at least portion of the outer edge of the sheet member.

4. The vehicle seat as claimed in claim 1, further comprising:
   a sheet member that covers the net structure; and
   a second reinforcement member formed on an opposite surface of the receiving frame to the surface on which the first reinforcement member is formed,
   wherein said second reinforcement member includes a fitting groove, and
   an outer edge of the sheet member is inserted into the fitting groove.

5. The vehicle seat as claimed in claim 1, wherein an edge of the first flange is brought into contact with the first reinforcement member.

6. The vehicle seat as claimed in claim 1, wherein an entirety of an edge of the first flange is brought into contact with the first reinforcement member.

7. The vehicle seat as claimed in claim 1, wherein
   the net frame includes a second flange,
   the receiving frame includes a first wall portion and a second wall portion,
   the first reinforcement member is formed on each of the first wall portion and the second wall portion,
   the first flange is in contact with the first reinforcement member formed on the first wall portion, and
   the second flange is in contact with the second reinforcement member formed on the second wall portion.

* * * * *